United States Patent
Elcock et al.

(10) Patent No.: US 11,974,336 B2
(45) Date of Patent: Apr. 30, 2024

(54) SYSTEM AND METHOD FOR GRAPHICAL SYMBOLIC WI-FI SSID DISPLAY SUPPORT

(71) Applicant: ARRIS Enterprises LLC, Suwanee, GA (US)

(72) Inventors: Albert F. Elcock, West Chester, PA (US); Charles Hardt, Lawrenceville, GA (US); Christopher S. DelSordo, Souderton, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 83 days.

(21) Appl. No.: 17/156,940

(22) Filed: Jan. 25, 2021

(65) Prior Publication Data

US 2021/0243823 A1     Aug. 5, 2021

Related U.S. Application Data

(60) Provisional application No. 62/967,856, filed on Jan. 30, 2020.

(51) Int. Cl.
    *H04W 76/11*     (2018.01)
    *H04W 48/10*     (2009.01)
    (Continued)

(52) U.S. Cl.
    CPC ............ *H04W 76/11* (2018.02); *H04W 48/10* (2013.01); *H04W 48/16* (2013.01); *H04W 72/0446* (2013.01)

(58) Field of Classification Search
    CPC ..... H04W 76/11; H04W 48/10; H04W 48/16; H04W 72/0446

(Continued)

(56) References Cited

U.S. PATENT DOCUMENTS 8,898,321 B2    11/2014   Edelstein et al.
2009/0085806 A1*   4/2009   Piersol ................. G01S 5/0236
                                                 342/386

(Continued)

FOREIGN PATENT DOCUMENTS

CN         106162575 A   * 11/2016
EP         2 170 001 B1     1/2016

(Continued)

OTHER PUBLICATIONS

Int'l Preliminary Report on Patentability issued Aug. 11, 2022 in Int'l Application No. PCT/US2021/014293.

(Continued)

*Primary Examiner* — Faisal Choudhury
(74) *Attorney, Agent, or Firm* — Panitch Schwarze Belisario & Nadel LLC

(57) ABSTRACT

System and method for displaying a graphical symbol as an SSID representative of a Wi-Fi network on a Wi-Fi client user device is disclosed, which includes storing a graphical symbol as an SSID for a Wi-Fi network at a network address based on a URL (the network address can be either internal or external to the Wi-Fi network); broadcasting an internal SSID and the URL in a broadcast message from a wireless access point device coupled to the Wi-Fi network to be accessed, the broadcasting performed by the wireless access point device operating independently of a Wi-Fi client user device; receiving the broadcast message at the Wi-Fi client user device; retrieving, by the Wi-Fi client user device, the graphical symbol stored at the network address using the internal SSID and the URL; and displaying, on the Wi-Fi client user device, the graphical symbol as the SSID for the Wi-Fi network.

22 Claims, 4 Drawing Sheets

(51) Int. Cl.
*H04W 48/16* (2009.01)
*H04W 72/04* (2023.01)
*H04W 72/0446* (2023.01)

(58) Field of Classification Search
USPC .......................................................... 370/338
See application file for complete search history.

(56) References Cited

U.S. PATENT DOCUMENTS

| | | | | |
|---|---|---|---|---|
| 2010/0266125 | A1* | 10/2010 | Tanaka | H04W 8/205 370/328 |
| 2012/0082144 | A1* | 4/2012 | Lee | H04L 67/51 370/338 |
| 2014/0071967 | A1* | 3/2014 | Velasco | H04L 12/1403 370/338 |
| 2016/0147900 | A1* | 5/2016 | Bezek | G06F 21/34 235/375 |
| 2016/0182624 | A1 | 6/2016 | Liang et al. | |
| 2017/0272824 | A1 | 9/2017 | Bunner | |
| 2017/0347133 | A1* | 11/2017 | Wang | H04N 21/2381 |
| 2021/0089772 | A1* | 3/2021 | Yang | G06V 10/764 |

FOREIGN PATENT DOCUMENTS

| | | |
|---|---|---|
| KR | 20170006139 A * | 7/2015 |
| KR | 10-2016-0089270 A | 7/2016 |

OTHER PUBLICATIONS

Notification of Transmittal of the International Search Report (Forms PCT/ISA/220 and PCT/ISA/210) and the Written Opinion of the International Searching Authority (Form PCT/ISA/237) issued May 6, 2021, by the International Application Division Korean Intellectual Property Office in corresponding International Application No. PCT/US2021/014293. (10 pages).

Office Action dated Aug. 31, 2023, issued in corresponding Canadian Application No. 3,165,844, 4 pgs.

* cited by examiner

SYSTEM AND METHOD FOR GRAPHICAL SYMBOLIC WI-FI SSID DISPLAY SUPPORT

FIELD OF THE DISCLOSURE

The present disclosure relates generally to displaying a graphical symbol as an SSID representative of a Wi-Fi network on a Wi-Fi client user device.

BACKGROUND OF THE DISCLOSURE

In current Wi-Fi networks, a unique SSID (Service Set Identifier) is used to identify the Wi-Fi access point. The SSID is the primary name associated with an 802.11 wireless local area network (WLAN), including home networks, business networks, public hotspots, etc. The SSID is a unique identifier that can be up to 32 alphanumeric characters long and is used for naming wireless networks.

The SSID may be chosen by the owner of the Wi-Fi network, or may be assigned randomly or be default. The SSID differentiates one Wi-Fi network from another, such that all access points and all mobile devices attempting to connect to a particular Wi-Fi network must use the same SSID to enable effective roaming.

Users will typically encounter an SSID most often when they are using a Wi-Fi client user device (e.g., PC, DTV, laptop, iPhone, iPod, iPad, or any other device that displays to the user the 32 alphanumeric character SSID) to connect to a wireless network. A list of SSIDs is displayed on the screen of the Wi-Fi device identifying the names of the wireless networks that are within range of the Wi-Fi device. A user selects the name of the local network to which they wish to connect, and then enters a password (if necessary) to connect to the wireless network.

The SSID identifies the wireless networks with up to 32 alphanumeric characters (i.e., letters and numbers). Thus, wireless network owners are limited in the manner in which they may name their networks. For example, businesses will typically include at least some indication of their business name as part of their SSID character string so that their Wi-Fi network is readily identifiable to a user. But since only alphanumeric characters may be used, businesses, as well as personal consumers, are limited in naming and identifying their networks.

From a branding perspective, generally as it related to businesses, it would be beneficial if the SSID of the Wi-Fi access point or hotspot was displayed as a picture, logo, or other graphical symbol as the representation of the Wi-Fi network to Wi-Fi clients. This would help promote and further strengthen the company's branding, as advertisements for businesses make use of logos and other graphical symbols all the time for company branding purposes. The ability to display a picture, logo, or other graphical symbol as the representation of the Wi-Fi network to Wi-Fi clients would extend this same branding mechanism to Wi-Fi client devices.

Additionally, rather than use only alphanumeric characters, personal consumers may also like to incorporate a picture of their family or other graphical symbol or artwork as a graphical representation of their personal Wi-Fi network.

The present disclosure is directed at overcoming one or more of the above-identified problems.

SUMMARY OF THE DISCLOSURE

The present disclosure expands upon the functionality of identifying a Wi-Fi network by implementing the display of a graphical symbol as the SSID for the network. For businesses, this allows the opportunity to utilize trademarks and other logos to identify the network to further promote branding of the business. For personal consumers, this allows the opportunity to utilize pictures and other artwork to identify their network and add a more personal touch. In one embodiment, a method for displaying a graphical symbol as an SSID representative of a Wi-Fi network on a Wi-Fi client user device is disclosed, the method including storing a graphical symbol as an SSID for a Wi-Fi network at a network address based on a URL (the network address can be either internal or external to the Wi-Fi network); broadcasting an internal (secret) SSID and the URL in a broadcast message from a wireless access point device coupled to the Wi-Fi network to be accessed, the broadcasting performed by the wireless access point device operating independently of a Wi-Fi client user device; receiving the broadcast message at the Wi-Fi client user device; retrieving, by the Wi-Fi client user device, the graphical symbol stored at the network address using the internal SSID and the URL; and displaying, on the Wi-Fi client user device, the graphical symbol as the SSID for the Wi-Fi network.

In one form of the disclosed method, the broadcast message comprises a beacon frame broadcast by the access point device. The internal SSID and the URL are provided in an optional frame of the beacon frame.

In one form of the disclosed method, the internal SSID includes a password, wherein the internal SSID and password provide for temporary connection of the Wi-Fi client user device to the Wi-Fi network for retrieval of the graphical symbol only. Once the graphical symbol is retrieved by the Wi-Fi client user device, the temporary connection is terminated. The internal SSID and password would not be displayed by the Wi-Fi client user device, as they are only used for a temporary connection to obtain the graphical symbol. Additionally, during the retrieving step, the Wi-Fi client user device would not indicate that it has connected to the Wi-Fi network.

The URL that is provided on the beacon frame could point to a server location in the cloud, or to a location on the access point device itself if the graphical symbol SSID was preloaded to the access point device by the MSOs backend server. Alternately, a user could load the graphical symbol SSID by interfacing with the router's portal directly. If the URL is located in the cloud, the Wi-Fi client could obtain the graphical symbol SSID through a 4G/5G cellular network or through the router using its own hotspot connection or by an alternate means of connection to the cloud (other than the W-Fi network to which the user is trying to connect). In these alternate embodiments where the URL does not point to the access point device, and a temporary connection to the Wi-Fi network to which the user is trying to connect is not established.

In one form of the disclosed method, the Wi-Fi client user device connects to the Wi-Fi network using a 32-character SSID, but continues displaying the graphical symbol as the SSID for the Wi-Fi network after connection is complete. Both the 32-character SSID and the graphical symbol as the SSID for the Wi-Fi network for subsequent connections to the Wi-Fi network.

In another embodiment, a method for displaying a graphical symbol as an SSID representative of a Wi-Fi network on a Wi-Fi client user device is disclosed, the method including storing a graphical symbol as an SSID for a Wi-Fi network at a network address (which may be internal or external to the Wi-Fi network); broadcasting fragmented pieces of the graphical symbol in a broadcast message from a wireless access point device coupled to the Wi-Fi network to be accessed, the broadcasting performed by the wireless access point device operating independently of a Wi-Fi client user device; receiving the broadcast message at the Wi-Fi client user device; assembling, by the Wi-Fi client user device, the fragmented pieces of the graphical symbol received from the broadcast message to form the graphical symbol; and displaying, on the Wi-Fi client user device, the graphical symbol as the SSID for the Wi-Fi network.

In another embodiment, the 32-character SSID is used by the Wi-Fi client user device to connect to the wireless access point initially. Upon connection to the network using the 32-character SSID, the Wi-Fi client user device then uses the URL provided in the optional frame of the broadcast message to obtain the graphical symbol stored at the network address and display the graphical symbol as the SSID for the network. From that point forward, the Wi-Fi client user device will display the graphical symbol as the SSID for that Wi-Fi network.

In another embodiment, a system for displaying a graphical symbol as an SSID representative of a Wi-Fi network on a Wi-Fi client user device is disclosed, the system including a wireless access point device coupled to a Wi-Fi network to be accessed, the wireless access device configured to broadcast a broadcast message including information about the Wi-Fi network, the broadcast message including an internal SSID and a URL, wherein the URL points to a network address (which may be internal or external to the Wi-Fi network) at which a graphical symbol is stored; and a processing device configured to: temporarily connect a Wi-Fi client user device receiving the broadcast message to the Wi-Fi network using the internal SSID; retrieve the graphical symbol stored at the network address using the URL; and transmit the graphical symbol to the Wi-Fi client user device for displaying, on the Wi-Fi client user device, the graphical symbol as the SSID for the Wi-Fi network.

In one form of the disclosed system, the broadcast message comprises a beacon frame broadcast by the access point device. The internal SSID and the URL are provided in an optional frame of the beacon frame.

In one form of the disclosed system, the internal SSID includes a password, wherein the processing device is further configured to temporarily connect, using the internal SSID and password, the Wi-Fi client user device to the Wi-Fi network for retrieval of the graphical symbol only. The processing device is further configured to terminate the temporary connection once the graphical symbol is retrieved by the Wi-Fi client user device. The internal SSID and password would not be displayed by the Wi-Fi client user device, as they are only used for a temporary connection for retrieval of the graphical symbol.

It is an object of the present disclosure to permit owners of Wi-Fi networks to utilize graphical symbols (other than purely alphanumeric characters) to identify their Wi-Fi networks on Wi-Fi client user devices.

In another embodiment, a method for displaying a graphical symbol as an SSID representative of a Wi-Fi network on a Wi-Fi client user device is disclosed, the method including storing a graphical symbol as an SSID for a Wi-Fi network at a network address based on a URL, the network address external to the Wi-Fi network; broadcasting the URL in a broadcast message from a wireless access point device coupled to the Wi-Fi network to be accessed, the broadcasting performed by the wireless access point device operating independently of a Wi-Fi client user device; receiving the broadcast message at the Wi-Fi client user device; uploading, by the Wi-Fi client user device, the graphic symbol through a portal of a router coupled to the access point device using the URL and storing the graphical symbol locally on the Wi-Fi client; and displaying, on the Wi-Fi client user device, the graphical symbol as the SSID for the Wi-Fi network.

In one form of the disclosed method, the Wi-Fi client user device uploads the graphical symbol through a 4G/5G cellular network or through the router using its own hotspot connection.

Additional features, aspects, objects, advantages, and possible applications of the present disclosure will become apparent from a study of the exemplary embodiments and examples described below, in combination with the Figures, and the appended claims.

DETAILED DESCRIPTION OF THE DISCLOSURE

Figure 1:
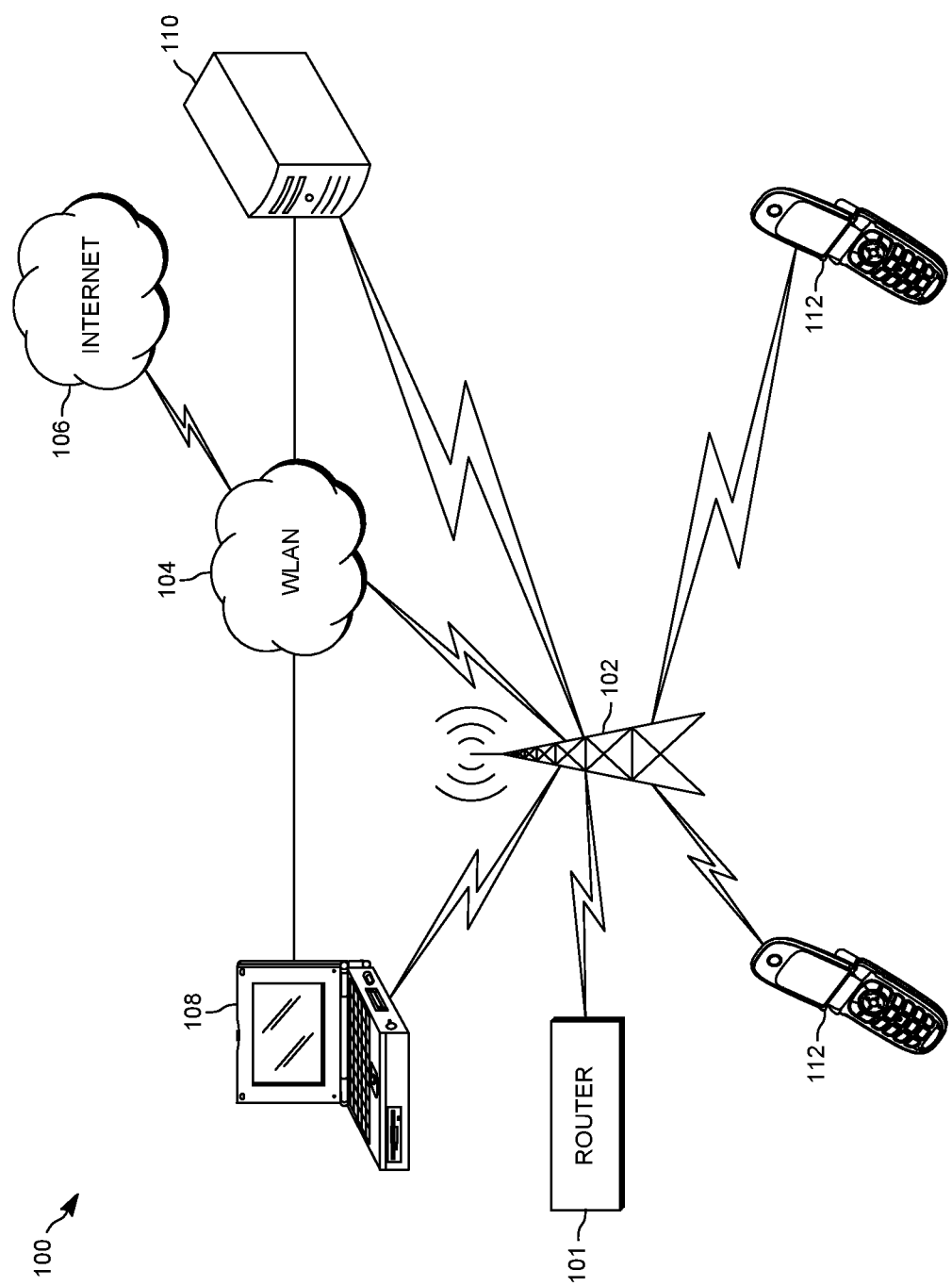
FIG. 1 is an illustration of an exemplary network environment for a system and method for symbolic graphical Wi-Fi display support.

Referring to FIG. 1, an exemplary network environment for a system and method for symbolic graphical Wi-Fi display support according to the present disclosure is shown, at 100. The system 100 includes a router 101 wireless access device 102 which controls access to a wireless local area network 104 for connection to the Internet 106. The wireless access device 102 may be connected to a router (not shown as a separate device) via a wired connection (e.g., via an Ethernet cable) or can be an integrated component of the router itself.

The initial step is to upload a graphical symbolic SSID to the Wi-Fi router. As used herein, the term graphical symbolic SSID (and also graphical symbol SSID and other formatives) is to be interpreted as data that is in computer displayable format, such as JPEG, PNG, PDF, bitmapped graphics format, GIFF format, video formats, etc. Essentially, any data that is in computer displayable format that is not purely alphanumeric characters is to be interpreted to be graphical symbolic SSID.

The Wi-Fi consumer 108 could log into the Wi-Fi router and WebGUI (not shown) and upload the graphical symbolic SSID (for example, for 5 and 2.4 GIG ranges). Alternatively, the Wi-Fi service provider could load graphical symbolic SSID directly from the Wi-Fi management server 110, which could be located either on-site or off-site (e.g., in the cloud). The graphical symbolic SSID is stored at a network address. The network address could be an address within the WLAN 104 or outside of the WLAN 104, for example, in the cloud.

Figure 2:
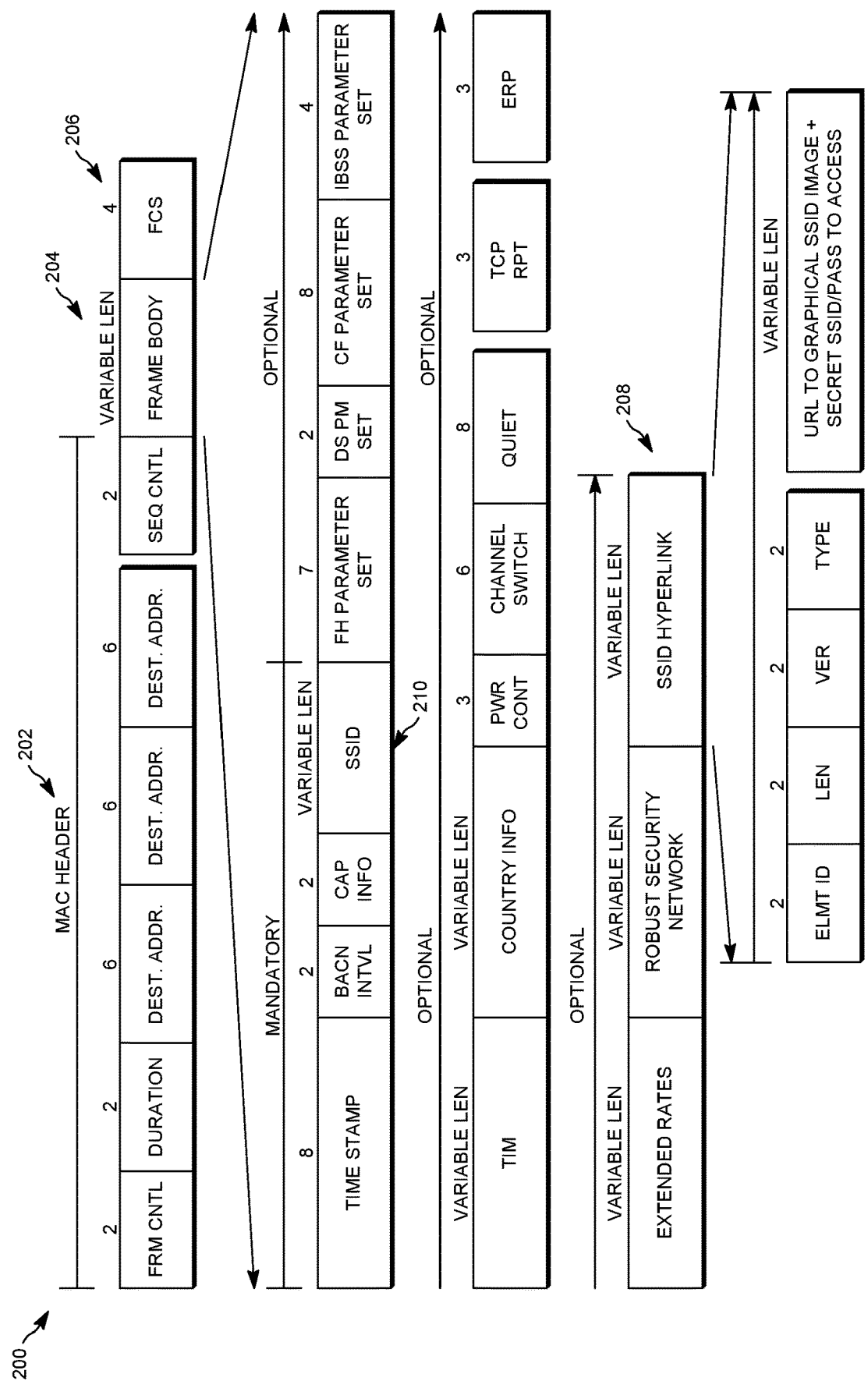
FIG. 2 is an illustration of a Wi-Fi beacon frame modified for symbolic graphical Wi-Fi display support.

When a Wi-Fi client user device 112 enters the presence of the wireless access device 102, the Wi-Fi client user device 112 typically receives a message 200 periodically broadcast from the wireless access device 102. This broadcast message 200, often referred to as a beacon frame, is illustrated in FIG. 2. The broadcast message 200 includes all of the information about the Wi-Fi network 104 and is periodically sent by the wireless access point 102 are defined intervals. The broadcast message 200 consists of MAC (media access control) header 202, frame body 204, and FCS (frame check sequence) 206 frame segments. The broadcast message 200 includes various parameters and identifiers that are well understood by one skilled in the art.

Within the frame body 204 are included optional frames. An internal (secret) SSID and password and also a URL (uniform resource locator) are transmitted in the broadcast message 200 in the optional frames, at 208. The internal SSID, password and URL are provided in addition to the standard 32-character SSID included in the broadcast message, at 210. The Wi-Fi client user device 112 would not display the internal SSID and password to the user. The internal SSID and password only provides support to allow the Wi-Fi client user device 112 to obtain the graphical symbol SSID stored at the network address. The URL points to the location of the network address at which the graphical symbol SSID is stored, which may be a location in the Wi-Fi router 101, the access point device 102, or a location in the Wi-Fi management server 110 located on-site or in the cloud.

When a Wi-Fi client user device 112 enters the presence of the wireless access device 102, the Wi-Fi client user device 112 will receive the broadcast message 200 which includes the internal (secret) SSID and password and URL within the optional frame, at 208. The Wi-Fi client user device 112 connects to the wireless access device 102 using the internal SSID and password. The mobile device 112 uses the URL to obtain the graphical symbol SSID from the network address. The connection using the internal SSID and password is a temporary connection. In one embodiment, the Wi-Fi client user device 112 would not indicate that it has connected to the wireless access device 102 during the temporary connection to obtain the graphical symbol SSID. Once the graphical symbol SSID has been obtained by the Wi-Fi client user device 112, the temporary connection is terminated. The graphical symbol SSID is then displayed at the network identifier/name on the Wi-Fi client user device 112.

Figure 3:
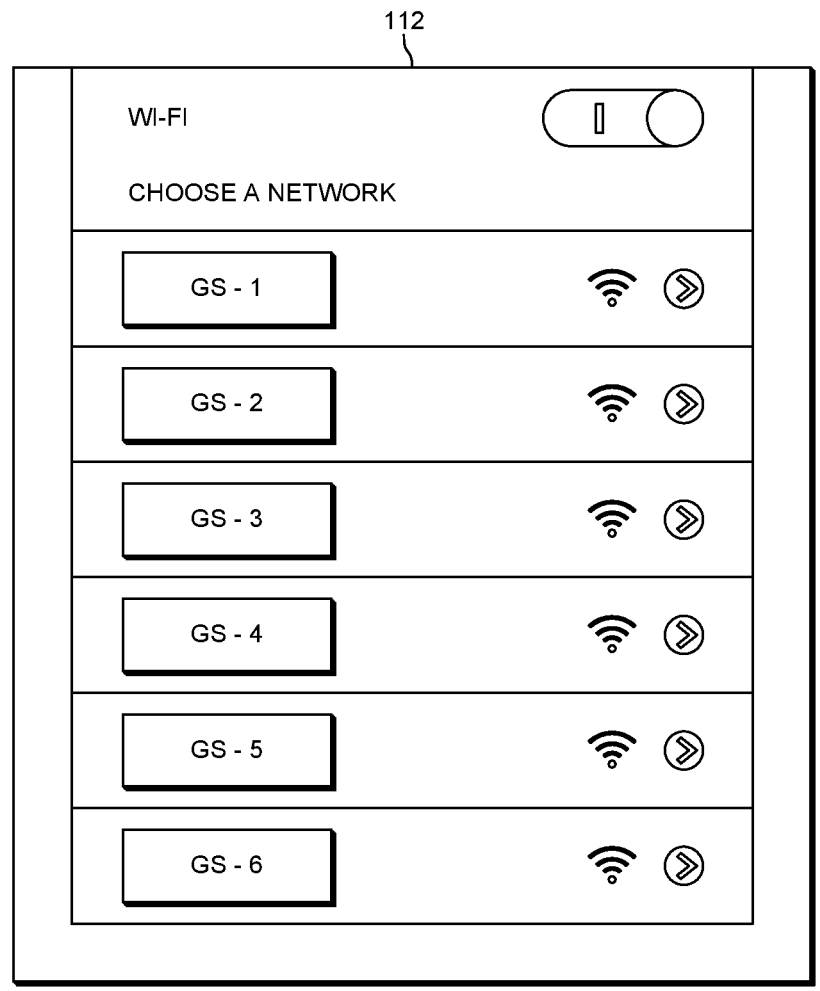
FIG. 3 is an illustration of a Wi-Fi client user device displaying graphical symbols as an SSID representative of a Wi-Fi network.

The URL that is provided in the broadcast message could point to a server location in the cloud. In this instance, the Wi-Fi client user device 112 could load the graphical symbol SSID by interfacing with the router's 101 portal directly using its own hotspot connection. If the URL is located in the cloud, the Wi-Fi client user device 112 could obtain the graphical symbol SSID by using a 4G/5G cellular network (which does not connect to the router 101), or by an alternate means of connection to the cloud (other than the W-Fi network to which the Wi-Fi client 112 is trying to connect). In these alternate embodiments where the URL does not point to the access point device 102, a temporary connection to the Wi-Fi network to which the Wi-Fi client user device is trying to connect is not established FIG. 3 illustrates a display of a Wi-Fi client user device 112 in the vicinity of various Wi-Fi networks that support graphical symbol SSID use. As shown in FIG. 3, instead of standard alphanumeric characters used to identify the network, graphical symbols (GS-1, GS-2, GS-3, GS-4, GS-5, GS-6) are used to identify the various networks. With respect to business owners, the graphical symbols may be a trademark or other logo or symbol associated to help further branding and strengthen the trademarks/logos. With respect to personal consumers, the graphical symbol may be a family picture or a drawing or other artwork. The graphical symbols may also include video or GIFF files. As previously indicated, the graphical symbol can be any data in computer readable format, other than purely alphanumeric characters.

If the Wi-Fi client user device 112 does not support graphical symbolic SSID use, then the standard 32-character SSID is displayed to identify the network When a user of the Wi-Fi client user device 112 selects one of the networks, the standard 32-character SSID, at 210, is used by the Wi-Fi client user device 112 to connect to the network. The Wi-Fi client user device 112 will continue to display the graphical symbolic SSID to identify the network after connection is complete, but will continue to use the 32-character SSID for standard protocol communication. In one embodiment, the Wi-Fi client user device 112 will save both the 32-character SSID and the graphical symbol SSID for subsequent connections to the same wireless access point.

In another embodiment of the present disclosure, instead of transmitted a graphical symbol SSID, password and URL for the Wi-Fi client user device 112 to retrieve the graphical symbol, the broadcast message 200 maybe include fragmented pieces of the graphical symbolic SSID data in the optional frames, at 208. The fragmented pieces could be transmitted in consecutive broadcast messages, and the Wi-Fi client user device 112 would re-assemble the fragmented pieces to generate the graphical symbol (GS-1, GS-2 . . . ) as the SSID for the network. In this form, a temporary connection to the network to obtain the graphical symbol would not be necessitated, as the graphical symbol would be included in the broadcast message 200.

In another embodiment of the present disclosure, the 32-character SSID is used by the Wi-Fi client user device 112 to connect to the wireless access point 102. In this form, a standard alphanumeric identifier would be initially displayed by the Wi-Fi client user device 112 to indicate a network in range. Upon connection to the network using the 32-character SSID, the Wi-Fi client user device uses the URL provided in the optional frame, at 208, to obtain the graphical symbol stored at the network address and display the graphical symbol as the SSID for the network. From that point forward, the Wi-Fi client user device will display the graphical symbol as the SSID for that Wi-Fi network.

Figure 4:
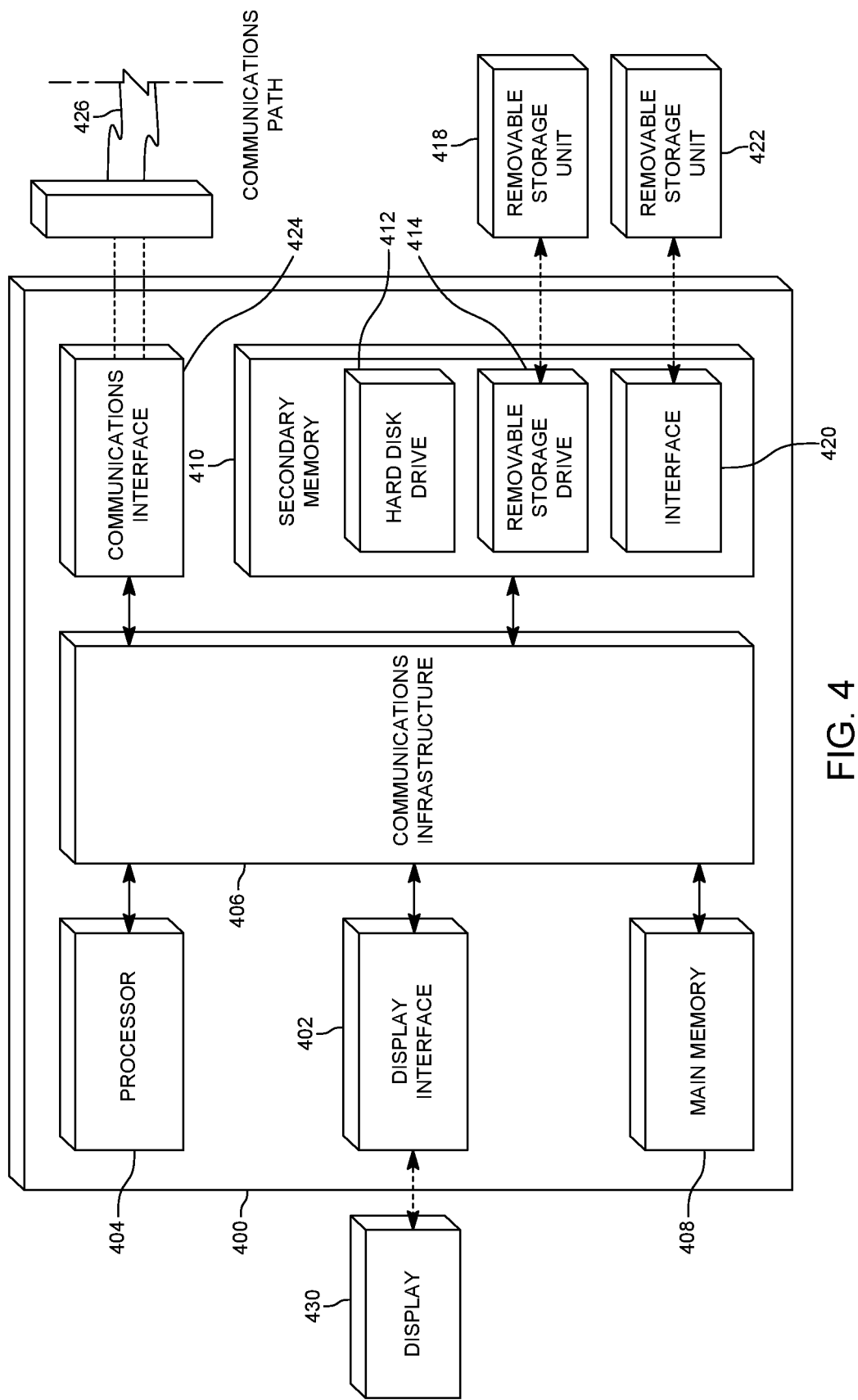
FIG. 4 is an illustration of exemplary hardware architecture for an embodiment of a communication device.

FIG. 4 illustrates a representative computer system 400 in which embodiments of the present disclosure, or portions thereof, may be implemented as computer-readable code. For example, the Wi-Fi router 101, wireless access device 102, Wi-Fi consumer device 108, Wi-Fi management server 110 and wireless mobile device 112 of FIG. 1 may be implemented in whole or in part by a computer system 400 using hardware, software, firmware, non-transitory computer readable media having instructions stored thereon, or a combination thereof and may be implemented in one or more computer systems or other processing systems. Hardware, software executed in a processor, or any combination thereof may embody modules and components used to implement the methods and steps of the present disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this representative computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 508 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 510, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods as discussed herein. Accordingly, such computer programs may represent controllers of the computer system 400. Where the present disclosure is implemented using software executed on hardware, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software executed on hardware, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for the displaying of a graphical symbol as an SSD representative of a Wi-Fi network on a Wi-Fi client user device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope

We claim:

1. A method for displaying a graphical symbol as a service set identifier (SSID) representative of a Wi-Fi network on a Wi-Fi client user device, comprising:
   receiving, by a Wi-Fi client user device, a broadcast message from a wireless access point device coupled to a Wi-Fi network to be accessed by the Wi-Fi client user device, the broadcast message including an internal service set identifier (SSID) and a uniform resource locator (URL) for the Wi-Fi network to be accessed, the URL pointing to a location of a network address, and the broadcast message being transmitted by the wireless access point device operating independently of the Wi-Fi client user device;
   retrieving, by the Wi-Fi client user device, a graphical symbol from the network address using the URL, the graphical symbol representing the SSID for the Wi-Fi network to be accessed;
   storing, by the Wi-Fi client user device, the graphical symbol locally on the Wi-Fi client user device; and
   displaying, on the Wi-Fi client user device, the graphical symbol as the SSID for the Wi-Fi network.

2. The method of claim 1, wherein the broadcast message comprises a beacon frame broadcast by the access point device.

3. The method of claim 2, wherein the internal SSID and the URL are provided in an optional frame of the beacon frame.

4. The method of claim 1, wherein the graphical symbol is stored locally on the access point device, and wherein the internal SSID includes a password, and wherein the internal SSID and the password provide for temporary connection of the Wi-Fi client user device to the Wi-Fi network for retrieval of the graphical symbol only.

5. The method of claim 4, wherein once the graphical symbol is retrieved by the Wi-Fi client user device, the temporary connection is terminated.

6. The method of claim 4, wherein the internal SSID and the password are not displayed by the Wi-Fi client user device.

7. The method of claim 1, wherein the network address is internal to the Wi-Fi network.

8. The method of claim 1, wherein the network address at which the graphical symbol is stored is external to the W-Fi network, and wherein the retrieving step comprises uploading, by the Wi-Fi client user device, the graphic symbol through a 4G/5G cellular network and storing the graphical symbol locally on the Wi-Fi client.

9. The method of claim 1, further comprising:
   connecting, by the Wi-Fi client user device, to the Wi-Fi network using a 32-character SSID; and
   continue displaying, on the Wi-Fi client user device, the graphical symbol as the SSID for the Wi-Fi network after connection is complete.

10. The method of claim 9, further comprising:
    saving, by the Wi-Fi client user device, both the 32-character SSID and the graphical symbol as the SSID for the Wi-Fi network for subsequent connections to the Wi-Fi network.

11. The method of claim 1, wherein during the retrieving step the Wi-Fi client user device does not indicate that it has connected to the Wi-Fi network.

12. A method for displaying a graphical symbol as a service set identifier (SSID) representative of a Wi-Fi network on a Wi-Fi client user device, comprising:
    receiving, by a Wi-Fi client user device, a broadcast message from a wireless access point device coupled to a Wi-Fi network to be accessed by the Wi-Fi client user device, the broadcast message including a uniform resource locator (URL) for the Wi-Fi network to be accessed, the URL pointing to a location of a network address, and the broadcast message being transmitted by the wireless access point device operating independently of the Wi-Fi client user device;
    retrieving, by the Wi-Fi client user device through a 4G/5G cellular network, a graphical symbol from the network address using the URL, the graphical symbol representing the SSID for the Wi-Fi network to be accessed;
    uploading, by the Wi-Fi client user device, a graphical symbol through the 4G/5G cellular network;
    storing, by the Wi-Fi client user device, the graphical symbol locally on the Wi-Fi client user device; and
    displaying, on the Wi-Fi client user device, the graphical symbol as the SSID for the Wi-Fi network.

13. A system for displaying a graphical symbol as a service set identifier (SSID) representative of a Wi-Fi network on a Wi-Fi client user device, comprising:
    a wireless access point device coupled to a Wi-Fi network to be accessed; and
    a Wi-Fi client user device configured to:
      receive a broadcast message from a wireless access point device coupled to a Wi-Fi network to be accessed by the Wi-Fi client user device, the broadcast message including an internal service set identifier (SSID) and a uniform resource locator (URL) for the Wi-Fi network to be accessed, the URL pointing to a location of a network address, and the broadcast message being transmitted by the wireless access point device operating independently of the Wi-Fi client user device;
      retrieve a graphical symbol from the network address using the URL, the graphical symbol representing the SSID for the Wi-Fi network to be accessed;

store the graphical symbol locally on the Wi-Fi client user device; and display the graphical symbol as the SSID for the Wi-Fi network.

14. The system of claim 13, wherein the broadcast message comprises a beacon frame broadcast by the access point device.

15. The system of claim 14, wherein the internal SSID and the URL are provided in an optional frame of the beacon frame.

16. The system of claim 13, wherein the graphical symbol is stored locally on the access point device, and wherein the internal SSID includes a password, and wherein the internal SSID and the password provide for temporary connection of the Wi-Fi client user device to the Wi-Fi network for retrieval of the graphical symbol only.

17. The system of claim 16, wherein once the graphical symbol is retrieved by the Wi-Fi client user device, the temporary connection is terminated; and wherein the internal SSID and the password are not displayed by the Wi-Fi client user device.

18. The system of claim 13, wherein the network address at which the graphical symbol is stored is external to the W-Fi network, and wherein the retrieving step comprises uploading, by the Wi-Fi client user device, the graphic symbol through a 4G/5G cellular network and storing the graphical symbol locally on the Wi-Fi client.

19. The system of claim 13, wherein the Wi-Fi client device is further configured to:

connect to the Wi-Fi network using a 32-character SSID; and continue displaying the graphical symbol as the SSID for the Wi-Fi network after connection is complete.

20. The system of claim 13, wherein during the retrieving step the Wi-Fi client user device does not indicate that it has connected to the Wi-Fi network.

21. The system of claim 20, wherein the Wi-Fi client device is further configured to:

Save both the 32-character SSID and the graphical symbol as the SSID for the Wi-Fi network for subsequent connections to the Wi-Fi network.

22. A system for displaying a graphical symbol as a service set identifier (SSID) representative of a Wi-Fi network on a Wi-Fi client user device, comprising:

a wireless access point device coupled to a Wi-Fi network to be accessed; and a Wi-Fi client user device configured to:

receive a broadcast message from a wireless access point device coupled to a Wi-Fi network to be accessed by the Wi-Fi client user device, the broadcast message including a uniform resource locator (URL) for the Wi-Fi network to be accessed, the URL pointing to a location of a network address, and the broadcast message being transmitted by the wireless access point device operating independently of the Wi-Fi client user device;

retrieve, through a 4G/5G cellular network, a graphical symbol from the network address using the URL, the graphical symbol representing the SSID for the Wi-Fi network to be accessed;

upload a graphical symbol through a 4G/5G cellular network;

store the graphical symbol locally on the Wi-Fi client user device; and display the graphical symbol as the SSID for the Wi-Fi network.

* * * * *